UNITED STATES PATENT OFFICE.

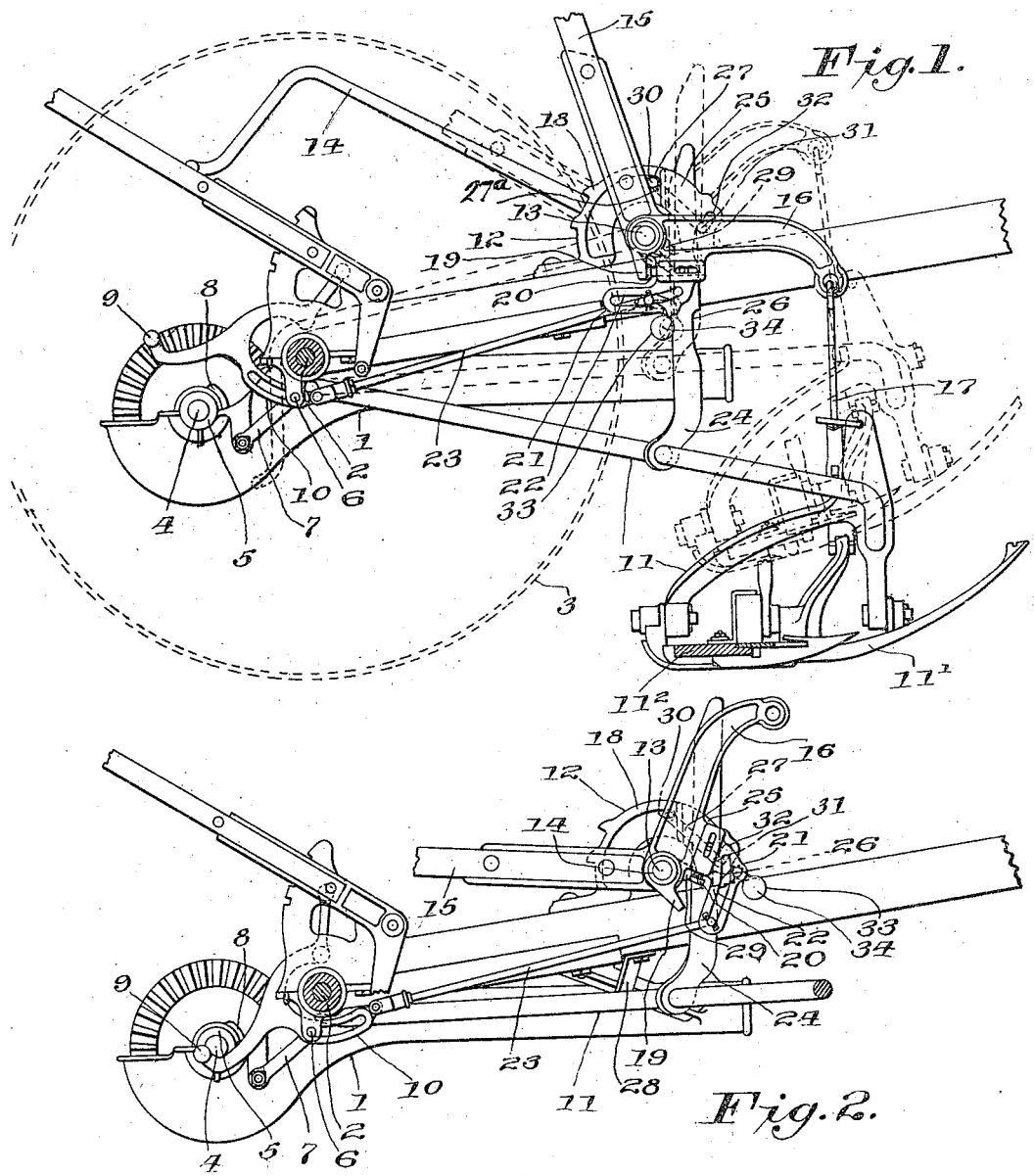

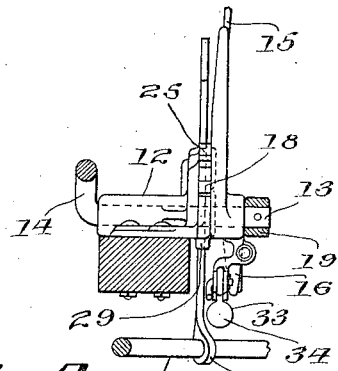
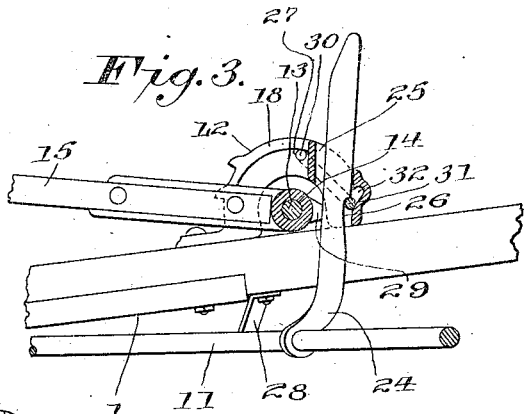
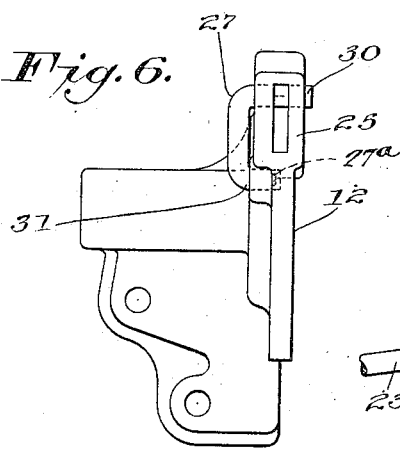
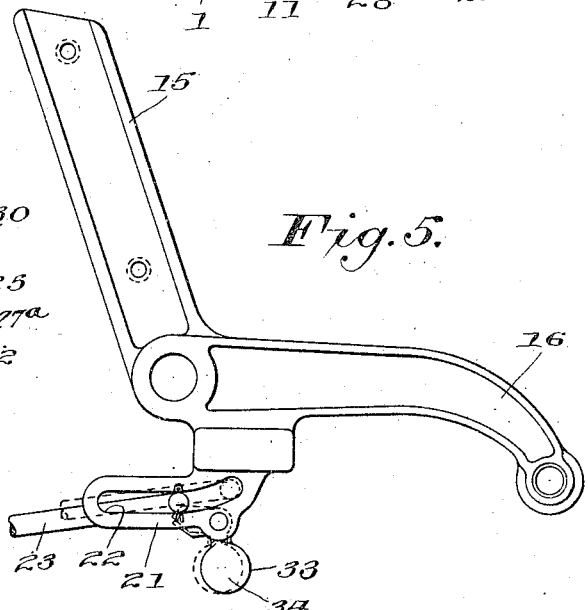
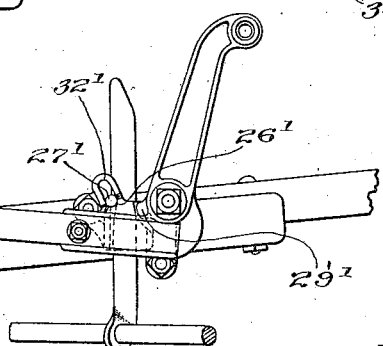

JOHN W. LATIMER, OF CHICAGO, ILLINOIS, ASSIGNOR TO INTERNATIONAL HARVESTER COMPANY OF NEW JERSEY, A CORPORATION OF NEW JERSEY.

MOWING-MACHINE.

1,237,661.     Specification of Letters Patent.     Patented Aug. 21, 1917.

Application filed October 3, 1913. Serial No. 793,083.

*To all whom it may concern:*

Be it known that I, JOHN W. LATIMER, a citizen of the United States, residing at Chicago, in the county of Cook and State of Illinois, have invented certain new and useful Improvements in Mowing-Machines, of which the following is a full, clear, and exact specification.

My invention relates to mowing machines, and particularly to the type commonly called "vertical lift mowers."

It has for its object to provide improved means whereby, when the hand lever is moved forward for the purpose of permitting the finger bar to move from a vertical to a horizontal position and the clutch mechanism to operatively engage, the coupling frame is not permitted to descend until the finger bar has assumed an angle making it safe to permit the cutting apparatus to be operatively connected with the power transmitting mechanism, and also to provide improved means for controlling the clutch shipping mechanism by its connection with the hand lever mechanism.

In order that my invention may be fully and clearly disclosed, I have illustrated in the accompanying drawings two embodiments which the same may assume in practice.

In these drawings:—

Figure 1 is a side elevation of part of a mowing machine, partly in section, and designed to illustrate the operation of my invention;

Fig. 2 is a similar view showing some of the same parts in a different position of adjustment;

Fig. 3 is a sectional detail of part of the coupling frame controlling mechanism shown in Fig. 1;

Fig. 4 is an end elevation of Fig. 3;

Fig. 5 is a side elevation of part of the hand lever mechanism on an enlarged scale;

Fig. 6 is a top plan view of a sector bracket member designed to form a connection between the hand lever and the wheeled frame of the machine; and Fig. 7 is a modified form of my invention.

The same reference characters designate like parts throughout the several views.

1 represents a part of the wheeled frame in which is journaled a main shaft 2, upon which is mounted the carrying wheels 3. 4 is the usual cross or power shaft journaled in bearings 5 carried by the wheeled frame, one only being shown, and deriving motion from the main shaft 2. A common form of clutch mechanism, such as shown and described in my Patent No. 856,269, issued June 11, 1907, forms part of the gear connection between the shafts 2 and 4, and includes a clutch shipping bar 6 slidably mounted upon the main frame and having an arm 7 at the stubbleward end thereof which is connected with a clutch shipping fork 8. 9 is a foot lever pivotally connected with the main frame having a slotted cam portion 10 that engages the grainward end of the rod 6, all of the parts being substantially the same as shown and described in my former patent as noted above. 11 represents part of the coupling frame having a shoe 11¹ and a finger bar 11² pivotally connected at one end thereof and its opposite end pivotally connected with the main frame of the machine in any preferred manner. 12 represents a bracket member secured to the main frame, and includes a transversely disposed sleeve member, in which is journaled a short rock shaft 13 integral with a longitudinally disposed foot lift lever 14 at its stubbleward end that extends rearward within convenient reach of the operator, and loosely mounted upon the opposite end of the shaft is a hand lever 15 having a forwardly extending arm 16 that is flexibly connected with the coupling frame and finger bar in any of the well-known ways, as by means including a link member 17. Integral with the bracket member 12 is the usual notched sector 18, with which may be associated a detent mechanism carried by the hand lever 15 in any of the well-known ways. 19 represents a depending arm secured to the end of the rock shaft 13 outside of the loosely journaled hand lever 15 and adapted to engage with the end of an adjusting screw 20 carried by the arm 16; the function of the screw being to adjust the position of the foot lift lever 14 relative to the connections between the arm 16 and the cutting apparatus, and 21 represents a web portion integral with the arm 16 and having a longitudinally disposed slot 22 curved at its front end concentric with the axis of shaft 13. As shown, this slot slidably receives the front end of a rod 23, the opposite end of which is secured to the front end of the cam portion 10 of the foot lever 9. 24 represents a vertically disposed locking member, having its lower end loosely connected with the coupling frame member 11 and its upper end slidably received by a box member 25 integral with the bracket member 12. The locking member 24 is provided with a depression 26 intermediate its ends with which engages a latch member 27, carried by the bracket member 12, and secured against displacement by the cotter pin 27$^a$ when the coupling frame has reached a predetermined degree of elevation, as controlled by a fixed part 28 of the wheeled frame contacting with the coupling frame (Figs. 2 and 3.) The member 24 is held in engagement with the latch member 27 by means of a cam member 29 projecting radially from the hub part of the hand lever 15. The depression 26 in the member 24 is curved outward and upward at its upper end in a manner permitting the member 24 to be automatically released by means of the weight of the coupling frame when the hand lever is moved forward or to the right from the position shown in Fig. 3 and the cam member 29 is released from engagement therewith. I prefer that the latch 27 be U-shaped in form, as shown in Fig. 6, having one arm 30 pivotally mounted upon the bracket 12 and the remaining arm 31 received by a slot 32 in the bracket member disposed in a manner permitting the latch to swing freely into the depression 26 when the associated parts have reached a predetermined limit of movement. In Figs. 1, 2 and 3 the latch member 27 is shown in position at the extreme lower end of the slot 32, in which position the latch rests in the recess 26 of the member 24 and locks said member in its upper position. The box member 25 permits a limited swinging movement of the member 24 about its connection with the coupling frame sufficient to release it from the part 31 of the latch when the hand lever 15 has been moved forward to a predetermined degree and the cam 29 disengaged from the locking member 24. In the operation of this construction the latch member 27 will swing upward about its axis as the coupling frame is raised by means of the hand lever and the member 24 will slide upward through the box member 25 and be pushed forward by the cam 29, and, when the member 24 has reached the limit of its upward movement, the latch 27 will swing freely by gravity to a locking position in the depression 26 upon the member 24. In order to release the member 24 from the latch 27, the hand lever (see Fig. 3) is moved upwardly, thus moving the cam 29 away from the member 24 and permitting said member to swing about its pivot on the coupling frame member 11 away from the latch 27. The latch is prevented from following the member 24 since this downward movement is limited by the walls of the slot 32, and this member is shown in Figs. 1, 2 and 3 in its extreme lower position. For this reason no binding action between the latch 27 and the member 24 takes place and the coupling frame and member 24 fall freely when the lever 15 is raised to the position shown in full lines in Fig. 1.

In Fig. 7 I have shown a modified form of the device, which is somewhat a reversal of parts of the mechanism. In this construction 24$^1$ is a vertically disposed locking member that is located in rear of the axis of the hand lever, and provided with a depression 26$^1$ which is disposed upon the rear side of the locking member 24$^1$. The latch member 27$^1$ in this form of construction is in the form of a transversely disposed pin received by an angularly disposed slot 32$^1$ that permits the pin to rise as the coupling frame is raised and roll freely into the depression 26$^1$ when the parts of the mechanism have reached the limit of their movement and the cam 29$^1$ upon the hand lever 15$^1$ has thrown the member 24$^1$ in the direction of the latch 27$^1$. It is also to be noted that since the depression 26$^1$ upon the part 24$^1$ is cam-shaped at its upper end, it will be disengaged freely from the latch member 27$^1$ when the hand lever has been moved upward and forward to lower the coupling frame and release the cam 29$^1$ from contact with the member 24$^1$.

It is desirable in the operation of machines of the class indicated that means be provided whereby as the bar is raised or lowered the clutch mechanism will be disengaged or engaged when the finger bar has reached a predetermined degree of elevation and that such mechanism will be locked securely against accidental displacement, and also that the operator be permitted to operate the clutch controlling mechanism freely in either direction when the finger bar is in a horizontal and operative position, and for such purpose I have provided the following mechanism: The slot 22 of this invention corresponds with the slotted portion 40 of my former Patent No. 856,269, as noted above, with the exception that it is made longer and at times will permit a greater degree of movement of the foot lever 9. In explanation: 33 represents a switch member pivotally mounted at one side of the slot 22 and adapted to close the slot against a portion of the sliding movement of the rod 23 therein. I prefer that the movement of the switch 33 be controlled by gravity, and have provided a weighted arm 34 integral with the switch that operates when the bar is raised, to swing the switch to the position shown in Fig. 2, where it is thrown across the slot 22 in such a manner that when the bar is next lowered this switch engages with the rod 23 and actuates the clutch releasing mechanism, as in my former patent, noted above. When the hand lever has moved to a predetermined degree in a forward direction to release the locking member 24, so that the finger bar and coupling frame descend below such plane, the weighted arm 34 will, moreover, swing forward, as shown by dotted lines in Fig. 1, to a position as shown by dotted lines in Fig. 5, and when in such position, with the finger bar upon the ground, or slightly raised from an operative position, the operator may control the clutch shipping mechanism at will in either direction by manipulating the foot lever 9, the point of the switch member 33 being made angular in a manner permitting the end of the rod 23 to ride over it and move it to the position shown by full lines in Fig. 5, when it is desired to throw the clutch mechanism out of engagement and also to permit a free movement of the rod in an opposite direction to permit the clutch mechanism to reëngage.

While this specification states in detail present and preferred embodiments of my invention, still in practice many slight deviations may be made from such detail without departing from the spirit of my invention, it being my intention to include within the scope of the appended claims all such modifications of my invention.

What I claim as my invention, and desire to secure by Letters Patent, is:

1. In a mowing machine, a main frame, a rising and falling coupling frame operatively connected thereto, means for raising and lowering said coupling frame, and a sliding locking connection between said frames controlled by said raising and lowering means.

2. In a mowing machine, a main frame, a rising and falling coupling frame connected therewith, means for raising and lowering said coupling frame including a lever, and a locking member connected with said coupling frame and having a sliding connection with said main frame movable to a position to sustain said coupling frame in a raised position and having its movement controlled by said lever.

3. In a mowing machine, a main frame, a rising and falling coupling frame connected therewith, means for raising and lowering said coupling frame, a locking member connected to said coupling frame and having a sliding connection with said main frame, and means controlled by said raising and lowering means for locking said member to said main frame and releasing the same therefrom.

4. In a mowing machine, a main frame, a rising and falling coupling frame operatively connected therewith, means for raising and lowering said coupling frame including a lever, a locking member carried on said coupling frame having a sliding connection with said main frame, and coöperating means carried by said lever and said main frame and controlled by said lever for holding said coupling frame in its adjusted position.

5. In a mowing machine, a main frame, a rising and falling coupling frame pivotally connected therewith, means including a lever pivotally mounted upon said main frame for raising and lowering said coupling frame, a vertically disposed locking member having its lower end operatively connected with said coupling frame and its upper end slidably received by a fixed part of said main frame, a latch member carried by said main frame and engageable with said locking member when said coupling frame is raised, and means on said lever for moving said locking member into position to engage with said latch member.

6. In a mowing machine, in combination, a main frame, a rising and falling coupling frame pivotally connected therewith, means including a lever pivotally mounted upon said main frame for raising and lowering said coupling frame, a vertically disposed locking member having its lower end pivotally connected with said coupling frame and its upper end slidably received by a fixed part of said main frame, a latch member carried by said main frame and engageable with said locking member when said coupling frame has reached a predetermined degree of elevation, and a cam carried by said lever and operative to move said locking member in position to engage with said latch.

7. In a mowing machine, in combination, a main frame, a rising and falling coupling frame pivotally connected therewith, a finger bar pivotally connected with said coupling frame, a rock shaft journaled upon said main frame, a foot lever secured to one end of said shaft, a hand lever loosely mounted upon the opposite end of said shaft and including a forwardly projecting arm, and an adjustable contact member carried by said arm, a connection between said arm and said coupling frame and finger bar, and an arm secured to said rock shaft and movable to a position to engage with said adjustable contact member.

8. In a mowing machine, a main frame, a rising and falling coupling frame operatively connected thereto, a finger bar pivotally connected with said coupling frame, a rock shaft journaled upon said main frame, a foot lever secured to one end of said shaft, hand lever mechanism secured to said shaft and including a forwardly projecting arm, a connection between said arm and said coupling frame and finger bar, and locking means including a sliding connection between said coupling frame and main frame controlled as to its locking action by either of said levers.

9. In a mowing machine, a main frame, a coupling frame thereon, cutting apparatus on said coupling frame, power mechanism for said cutting apparatus including clutch mechanism, means for raising and lowering said coupling frame and cutting apparatus, operative connections between said clutch mechanism and said raising and lowering mechanism for automatically throwing out said clutch mechanism as the cutting apparatus is raised, and means for automatically throwing in said clutch mechanism as the cutting apparatus is lowered said operative connections subsequently permitting said clutch mechanism to be thrown in and out independently of said raising and lowering means.

10. In a mowing machine, in combination, a main frame, a cutting apparatus including a coupling frame pivotally connected with said main frame, a finger bar pivotally connected with said coupling frame, power mechanism for said cutting apparatus including a clutch mechanism, means for raising and lowering said coupling frame and finger bar including a lever provided with a slot therein, a clutch shipping rod slidably received by the slot, and a switch member operative to control the effective length of said slot.

11. In a mowing machine, in combination, a main frame, a cutting apparatus including a coupling frame pivotally connected with said main frame, a finger bar pivotally connected with said coupling frame, power mechanism for said cutting apparatus including a clutch mechanism, means for raising and lowering said coupling frame and finger bar including a lever provided with a slot therein, a clutch shipping rod slidably received by said slot, and a swinging switch member operative to control the effective length of said slot.

12. In a mowing machine, in combination, a main frame, a cutting apparatus including a coupling frame pivotally connected with said main frame, a finger bar pivotally connected with said coupling frame, power mechanism for said cutting apparatus including a clutch mechanism, means for raising and lowering said coupling frame and finger bar including a lever provided with a slot therein, a clutch shipping rod slidably received by said slot, and a gravity swinging switch member operative to control the effective length of said slot.

13. In a mowing machine, in combination, a main frame, a rising and falling coupling frame pivotally connected thereto, a sector bracket forming part of said main frame, a hand lever pivotally mounted upon said sector bracket and operative to raise and lower said coupling frame, a vertically disposed locking member having a depression therein and its lower end pivotally connected with said coupling frame and its upper end slidably receiver by said sector bracket, a latch member carried by said sector bracket and movable to a position to engage with the depression in said locking member when said coupling frame has reached a predetermined degree of elevation, and a cam carried by said hand lever and operative to move said locking member in position to engage with said latch.

14. In a mowing machine, a main frame, cutting apparatus thereon including a coupling frame operatively connected with said main frame, a finger bar pivotally connected with said coupling frame, power mechanism for operating said cutting apparatus including clutch mechanism, raising and lowering means for said coupling frame provided at its lower end with a slotted extension, means operatively connected with said clutch mechanism and with said slotted extension for actuating the clutch mechanism when the raising and lowering means is operated, and means for limiting the movement of said connecting means when the raising and lowering means is in a predetermined position.

15. In a mowing machine, a main frame, a lever pivotally mounted thereon and provided at its lower end with a slotted extension, cutting apparatus mounted on said main frame, power mechanism for operating said cutting apparatus including a clutch mechanism, means operatively connected with said clutch mechanism and slidably connected with the slotted extension on said lever for actuating said clutch mechanism as the lever is operated, and means for restricting the movement of said connecting means in said slot when the lever is in a predetermined position.

In testimony whereof I affix my signature, in the presence of two witnesses.

JOHN W. LATIMER.

Witnesses:
   A. L. SPECHT,
   A. W. TEUFEL.